UNITED STATES PATENT OFFICE.

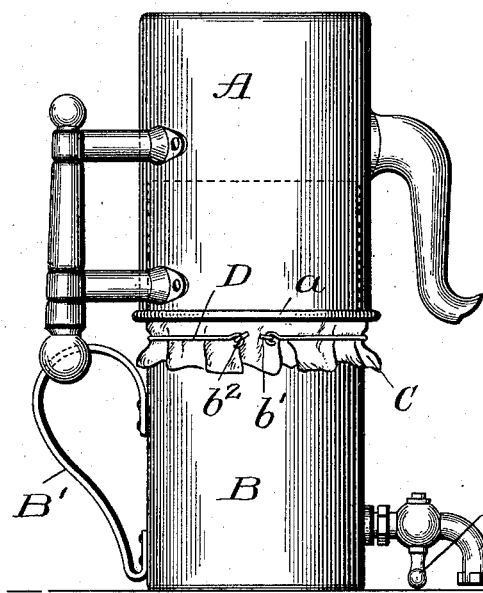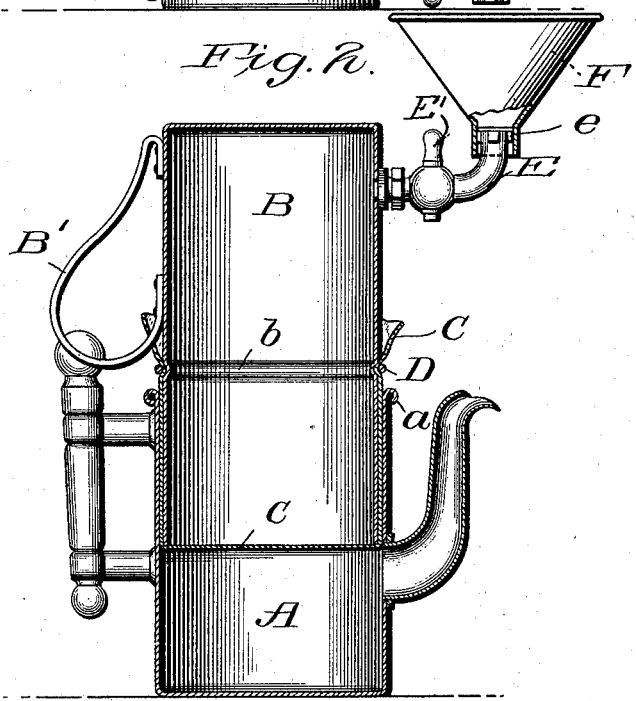

THOMAS B. FERGUSON, OF WASHINGTON, DISTRICT OF COLUMBIA.

COFFEE-POT.

SPECIFICATION forming part of Letters Patent No. 748,491, dated December 29, 1903.

Application filed September 11, 1903. Serial No. 172,790. (No model.)

*To all whom it may concern:*

Be it known that I, THOMAS B. FERGUSON, a citizen of the United States, residing at Washington, in the District of Columbia, have invented certain new and useful Improvements in Coffee-Pots; and I do hereby declare the following to be a full, clear, and exact description of the invention, such as will enable others skilled in the art to which it appertains to make and use the same.

My invention relates to improvements in coffee-pots; and it consists of certain novel features that will be hereinafter described and claimed.

Reference is made to the accompanying drawings, in which—

Figure 1 represents a side elevation of the coffee-pot reversed and mounted on the biggin. Fig. 2 is a centrally-vertical section through the device shown in Fig. 1.

A represents the coffe-pot proper, which is provided with the usual spout and handle and is preferably provided with a bead $a$ at the top.

B represents the biggin, which is provided with a handle B' of any suitable construction and may also be provided with a groove $b$ and eyes or other fastening devices $b'$ and $b^2$, to which the ends of the wire or cord D are secured. This wire sinks into the groove $b$ and holds the straining-cloth C firmly on the biggin.

E represents a cock which is provided with the usual handle E' and is preferably provided with slotted screw-threads $e$ to engage corresponding screw-threads on the funnel. (Shown in dotted lines in Fig. 1.)

The device is used as follows: A suitable amount of water is put in the biggin B, and the requisite supply of ground coffee is added. The cloth C is stretched on tight over the top of the biggin and is bound in place by means of the wire D or in any other convenient way. The coffee-pot is now forced down over the top of the biggin in inverted position, as shown in Fig. 1. The coffee is now put on a stove and allowed to boil so long as desired, and then the device is turned upside down, as indicated in Fig. 2. The coffee-grounds will settle on the straining-cloth C and will continue to be infused into the water, while very little of the liquid will pass through the straining-cloth, owing to the pressure of the air beneath the cloth.

When it is desired to let the coffee drip through the cloth, open the cock E temporarily, and the air coming in on top of the liquid will allow the liquid to drip through the strainer into the bottom of the coffee-pot. By adjusting the opening of the cock or by opening and closing the same the coffee may be caused to drip through slowly or rapidly, as may be desired, and the dripping may be stopped at any moment by shutting the cock E altogether. In this way the beverage may be drawn off when desired; but at the same time that not intended for instant use is retained above the strainer and in contact with the coffee-grounds and the infusion is continued.

In order to provide for the addition of more water or of more ground coffee when desired, I make the opening through the cock E considerably larger than is necessary to supply the air and provide a funnel F, detachably connected to the said cock, as by means of the slotted screw-joint hereinbefore described. Into this funnel the requisite amount of water may be poured, or, if desired, ground coffee can be put in the funnel and washed through by pouring in water.

It will be seen that I provide a coffee-pot in which the aroma of the coffee is not allowed to escape, in which part of the liquid may be allowed to drip through quickly, thus furnishing weak coffee for those who desire it, while the remainder of the liquid may be kept in contact with the ground coffee, thus providing a stronger beverage for those desiring it. Furthermore, it will be seen that the coffee may be weakened by the addition of water or may be strengthened by the addition of ground coffee, as may be desired, and this without exposing the contents of the vessel to the air. Thus by the use of the herein-described coffee-pot the aroma of the beverage is maintained, the full strength of the ground coffee may be diffused out, and a stronger or weaker beverage may be secured, as may be desired.

Having thus described my invention, what I claim, and desire to secure by Letters Patent of the United States, is—

1. The combination with a coffee-pot of a reversible biggin, adapted to fit in the top thereof, a strainer mounted over the top of the biggin, and a cock opening into the atmosphere near the end of said biggin, with a funnel adapted to be secured over the end of said cock, substantially as described.

2. The combination with a coffee-pot of a reversible biggin, adapted to fit in the top of the pot, a straining-cloth mounted over the top of the biggin, means for holding said straining-cloth in place, and a cock opening into the atmosphere near the end of said biggin, with a funnel adapted to be secured over the end of said cock, substantially as described.

3. The combination with a substantially cylindrical coffee-pot of a biggin adapted to telescope into the same, a straining-cloth secured over the open end of said biggin, and held between the biggin and the coffee-pot, and a cock opening to the atmosphere near the closed end of said biggin, with a funnel removably secured to the mouth of said cock, substantially as described.

4. The combination with a substantially cylindrical coffee-pot of a biggin adapted to telescope into said coffee-pot, and having a closed and an open end with a groove round its circumference, of a straining-cloth adapted to be secured over said open end and to pass beyond said groove, a fastener for holding said cloth into said groove, and a cock opening to the atmosphere near the closed end of said biggin, with a funnel adapted to be secured over the mouth of said cock, substantially as and for the purpose described.

In testimony whereof I affix my signature in presence of two witnesses.

THOMAS B. FERGUSON.

Witnesses:
  JOS. H. BLACKWOOD,
  M. M. O'CONNOR.